(12) United States Patent
Killian et al.

(10) Patent No.: US 8,542,098 B2
(45) Date of Patent: *Sep. 24, 2013

(54) LOCATION DETERMINATION AND GUIDANCE USING RADIO FREQUENCY IDENTIFICATION

(75) Inventors: Thomas Killian, Westfield, NJ (US); Christopher Rice, Parsippany, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,153

(22) Filed: Apr. 16, 2012

(65) Prior Publication Data

US 2012/0202531 A1 Aug. 9, 2012

Related U.S. Application Data

(63) Continuation of application No. 11/724,010, filed on Mar. 14, 2007, now Pat. No. 8,159,329.

(51) Int. Cl.
*G06K 7/01* (2006.01)

(52) U.S. Cl.
USPC ..... 340/8.1; 340/539.13; 340/10.1; 340/10.4; 455/457

(58) Field of Classification Search
USPC .............. 340/539.2, 539.23, 539.32, 539.1, 340/572.1, 572.5, 572.7, 1.1, 8.1, 10.1, 10.2, 340/10.3, 10.4, 10.5; 455/456.2, 456.1
See application file for complete search history.

(56) References Cited

U.S. PATENT DOCUMENTS

| | | | |
|---|---|---|---|
| 5,731,754 | A | 3/1998 | Lee et al. |
| 5,774,876 | A | 6/1998 | Woolley et al. |
| 6,563,417 | B1 | 5/2003 | Shaw |
| 6,617,963 | B1 | 9/2003 | Watters et al. |
| 6,912,398 | B1 | 6/2005 | Domnitz |
| 6,919,803 | B2 | 7/2005 | Breed |
| 7,081,818 | B2 | 7/2006 | Eckstein et al. |
| 7,091,861 | B2 | 8/2006 | Schmidtberg et al. |
| 7,100,052 | B2 | 8/2006 | Ghazarian |
| 7,127,261 | B2 | 10/2006 | Van Erlach |
| 7,161,489 | B2 | 1/2007 | Sullivan et al. |
| 7,278,571 | B2 | 10/2007 | Schmidtberg et al. |
| 7,659,823 | B1 | 2/2010 | Killian et al. |
| 8,159,329 | B1 | 4/2012 | Killian et al. |
| 2005/0245271 | A1 | 11/2005 | Vesuna |
| 2006/0022038 | A1 | 2/2006 | Hewlin et al. |
| 2006/0109131 | A1 | 5/2006 | Sen et al. |
| 2006/0178816 | A1 | 8/2006 | Dickin et al. |
| 2006/0267731 | A1 | 11/2006 | Chen |
| 2006/0273903 | A1 | 12/2006 | Kim et al. |
| 2007/0001851 | A1 | 1/2007 | Reynolds et al. |
| 2007/0008129 | A1 | 1/2007 | Soliman |
| 2007/0275735 | A1 | 11/2007 | Estevez |

*Primary Examiner* — Nabil Syed

(57) ABSTRACT

A method and system for location determination and guidance using radio frequency identification (RFID) are disclosed. A location of a mobile RFID reader can be determined by detecting stationary RFID tags located at fixed locations. Each RFID tag stores location information associated with its position as well as location information of at least one other RFID tag. The location information stored by each RFID tag can be used to direct a user from one RFID tag to another. Thus, RFID technology is also used to guide mobile RFID reader between the fixed locations of the stationary RFID tags.

18 Claims, 4 Drawing Sheets

LOCATION DETERMINATION AND GUIDANCE USING RADIO FREQUENCY IDENTIFICATION

This application is a continuation of U.S. patent application Ser. No. 11/724,010, filed Mar. 14, 2007, now U.S. Pat. No. 8,159,329 which is currently allowed and is herein incorporated by reference in its entirety.

The present invention is generally directed to radio frequency identification (RFID). More specifically, the present invention is directed to location determination and guidance using RFID.

Radio frequency identification (RFID) is a term for technologies that use radio waves to automatically identify people or objects. There are several methods of identification, but the most common is to store a serial number that identifies a person or object, and perhaps other information, on a microchip that is attached to an antenna (the chip and the antenna together are called an RFID transponder or an RFID tag). The antenna enables the chip to transmit the identification information to an RFID reader. The RFID reader typically converts the radio waves reflected back from the RFID tag into digital information.

RFID automatic identification methods can be used for the tracking of assets in a supply chain. RFID tags each having a unique identification number are typically attached to or incorporated in an asset, such as equipment, products, personnel, etc. As the tagged assets move, RFID readers read the RFID tags in order to track the location of the tagged assets. Typically, RFID readers are stationary and can read tags within a certain range, regardless of a direct line of sight between a reader and a tag. Since RFID offers the benefits of detection of assets in proximity to a reader, rather than a line of sight required by bar code technology, RFID technology is seen as a likely successor to bar code technology in asset tracking.

RFID tags can be passive or active. Passive tags do not require an internal power source, and are powered by an electrical current induced from the RF signal transmitted by an RFID reader. The lack of an internal power supply allows passive RFID tags to be small and inexpensive. Unlike passive RFID tags, active RFID tags have internal power sources which are used to power the tags. Active tags are typically more reliable than passive tags and can transmit at higher power levels than passive tags, allowing them to transmit to longer distances.

BRIEF SUMMARY OF THE INVENTION

The present invention provides a method and system capable of performing location determination and guidance using radio frequency identification (RFID). In embodiments of the present invention a location of a mobile RFID reader can be determined by detecting stationary REID tags located at fixed locations. In addition to determining a location of the mobile RFID reader, RFID technology is used in embodiments of the present invention to guide a user of a mobile RFID reader between the fixed locations of the stationary RFID tags. Each of the RFID tags stores location information associated with its position as well as location information of at least one other RFID tag. The location information stored by each RFID tag can be used to direct a user from one RFID tag to another.

In one embodiment of the present invention, a portable RFID reader device transmits a radio frequency signal in order to detect RFID tags positioned within a range of the radio frequency signal. From a detected RFID tag, the portable RFID reader device receives first location information of the detected RFID tag and second location information of at least one other RFID tag. As used herein "location information" of an RFID tag is any information relating to a fixed location of an RFID tag. The first location information can include the location of the detected RFID tag and the second location information can include the location of at least one other RFID tag, as well as map information showing a route between the location of the detected RFID tag and the location of at least one other RFID tag. The portable RFID reader can detect multiple tags and determine a location of the portable RFID reader based on the locations of the detected tags.

In another embodiment of the present invention, an RFID tag is fixed at a location. The RFID tag stores first location information associated with the location of the RFID tag and second location information associated with a location of at least one other RFID tag. In response to a radio frequency signal transmitted from an RFID reader device, the RFID tag transmits the first and second location information to the RFID reader device.

These and other advantages of the invention will be apparent to those of ordinary skill in the art by reference to the following detailed description and the accompanying drawings.

DETAILED DESCRIPTION

Figure 1:
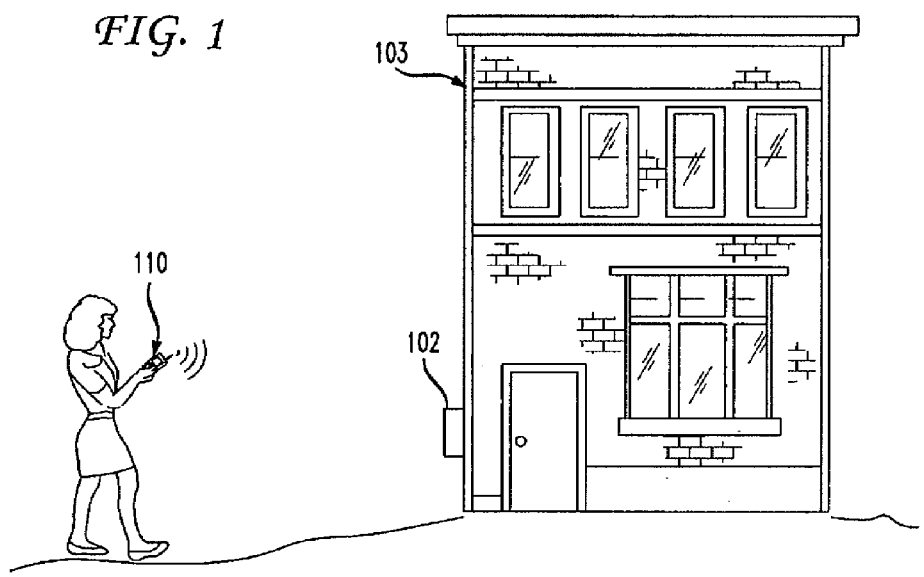
FIG. 1 illustrates an example of location determination and guidance using RFID according to an embodiment of the present invention.
Figure 1:
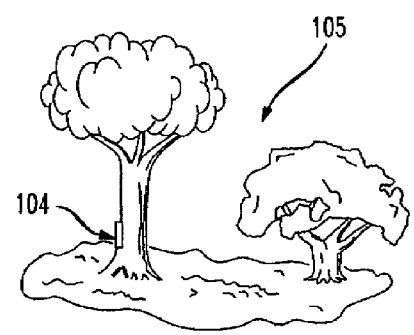
Figure 1:
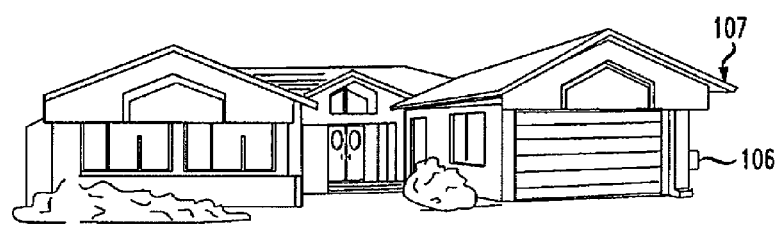

Embodiments of the present invention are directed to location determination and guidance using radio frequency identification (RFID). This can be accomplished by "tagging" the environment with RFID tags at fixed locations. These tags can then be read by a mobile RFID reader and location information stored in the RFID tags can be used to determine the location of the RFID reader. FIG. 1 illustrates an example of location determination and guidance using RFID. As illustrated in FIG. 1, RFID tags 102, 104, and 106 are located at fixed positions in an environment. RFID tag 102 is located at a building 103, RFID tag 104 is located at a park 105, and RFID tag is located at a restaurant 107. Each RFID tag 102, 104, and 106 is encoded with first location information associated with its fixed location. As used herein, "location information" of an RFID tag can be any information associated with the location of that RFID tag. For example, location information of an RFID tag can include the location of the RFID tag (e.g., latitude and longitude), map information for mapping the location of the RFID tag, historical information and/or information of interest regarding the location of the RFID tag, location based advertising content, etc. Each RFID tag 102, 104, and 106 is also encoded with second location information of at least one other RFID tag 102, 104, and 106, in addition to the first location information.

A user can use a mobile RFID reader 110 to read the RFID tags 102, 104, and 106 and retrieve the first and second location information stored in the RFID tags 102, 104, and 106. When a user is in the vicinity of at least one of the tags 102, 104, and 106, the position of the mobile RFID reader 110 of the user can be determined using the first location information of the RFID tags 102, 104, and 106 within a certain range of the mobile RFID reader 110. The second location information of other RFID tags, which is read from an RFID tag 102, 104, and 106 in the range of the RFID reader 110, can be used to direct the user to the locations of the other RFID tags. For example, in FIG. 1, the user is in the vicinity of building 103 and RFID tag 102. The mobile RFID reader 110 detects RFID tag 102 and reads the location information encoded on RFID tag 102. The location information read from RFID tag 102 includes the first location information of RFID tag 102 as well as second location information of RFID tags 104 and 106. The first location information of RFID tag 102 can include the location of RFID tag 102, a list of businesses in building 103 and historical information regarding building 103. The second location information of RFID tags 104 and 106 read by the mobile RFID reader 110 from RFID tag 102 can include a location of RFID tags 104 and 106 and map information showing a route from RFID tag 102 to RFID tags 104 and 106. Accordingly, if the user wishes to go to park 105 or restaurant 106, the second location information of RFID tags 104 or 106 read from RFID tag 102 can be used by the mobile RFID reader 110 to guide the user to RFID tags 104 or 106. Accordingly, the mobile RFID reader 110 can be guided between the RFID tags 102, 104, and 106 by the second location information stored on the RFID tags 102, 104 and 106, and the mobile RFID reader 110 can determine its location and read additional information about its location using the first location information stored on RFID tags 102, 104, and 106.

Figure 2:
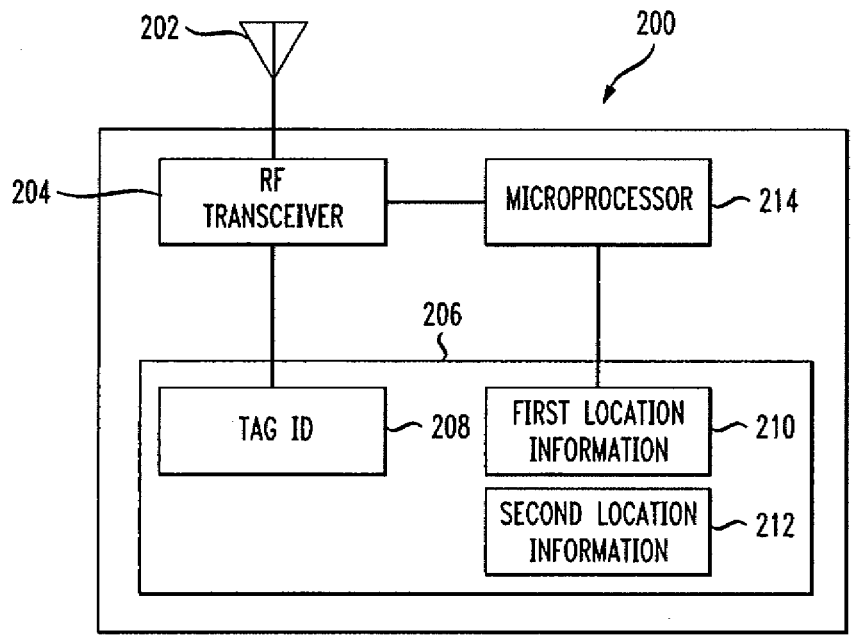
FIG. 2 illustrates a block diagram of an RFID tag according to an embodiment of the present invention.

FIG. 2 illustrates a block diagram of an RFID tag 200 according to an embodiment of the present invention. As illustrated in FIG. 2, RFID tag 200 includes an RF transceiver 204 that transmits and receives RF signals through an antenna 202, a memory 206, and a microprocessor 214. The memory 206 stores a tag ID 208, such as a serial number, as well as first and second location information 210 and 212, respectively. The first location information 210 is location information of RFID tag 200, and can include any information relating to a location of RFID tag 200. The second location information 212 is location information of at least one other RFID tag. In response to the RF transceiver 204 receiving an RF signal through the antenna 202, the microprocessor 214 controls the RF transceiver 204 to perform a backscattering operation to transmit an RF signal including information stored in the memory 206. The transmitted RF signal can include the tag ID 208 and/or the first and second location information 210 and 212. The memory 206 may be re-writeable such that information included in an RF signal received by the RF transceiver 204 through the antenna 206 can be stored in the memory 206. As illustrated in FIG. 2, RFID tag 200 is a passive tag and does not have an internal power source. Accordingly, RFID tag 200 is powered by an electrical current induced from RF signals received through the antenna 202. Although FIG. 2 shows a passive RFID tag 200, it is possible to implement the present invention with an active RFID tag having an internal power source as well.

Figure 3:
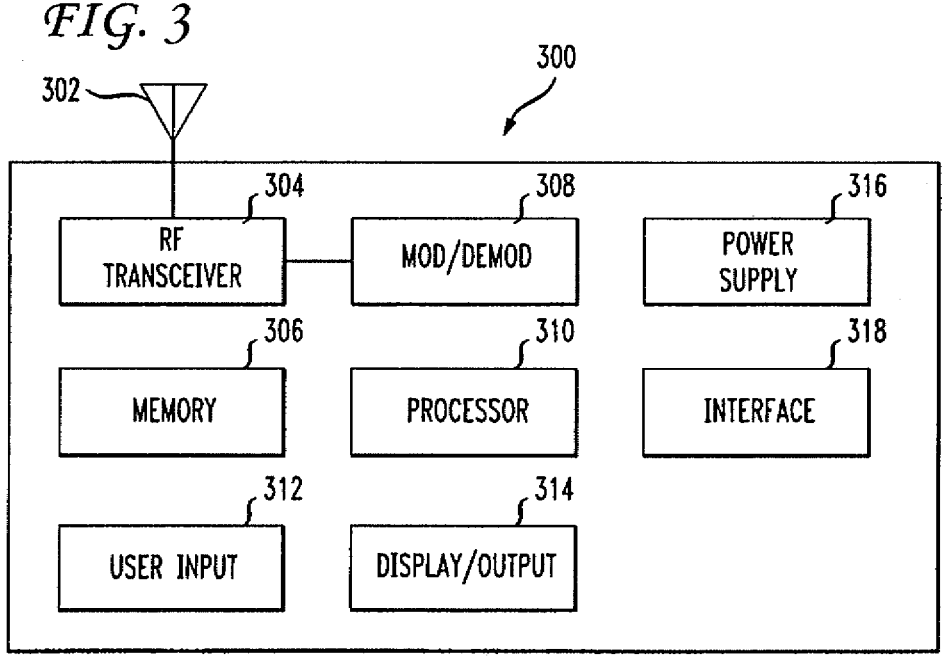
FIG. 3 illustrates a block diagram of a mobile RFID reader according to an embodiment of the present invention.

FIG. 3 illustrates a block diagram of a mobile RFID reader 300 according to an embodiment of the present invention. The mobile RFID reader may be a stand alone device or may be included in some other types of portable user device including cellular telephones, PDAs, laptop computers, portable music players, etc. The mobile RFID reader 300 includes an RF transceiver 304 that transmits and receives RF signals through an antenna 302. The RF transceiver 304 transmits RF signals in a certain frequency band through the antenna 302 in order to detect any RFID tags within a range of the transmitted RF signal, and receives backscattered RF signals through the antenna 302 in response. A modulator/demodulator 308 modulates outgoing RF signals being transmitted by the RF transceiver 304 and demodulates incoming RF signals received by the RF transceiver 304. A memory 306 can be used to store information received by the RF transceiver including location information received from RFID tags. The memory 306 can also be used to store various software applications (i.e., computer program instructions), such as a map application for mapping location information received from RFID tags. A processor 310 controls overall operations of the mobile RFID reader 300 and runs applications stored in the memory 306. The mobile RFID reader 300 includes a user input 312, such as a keypad, buttons, etc., which allows for user interaction with the mobile RFID reader 300, and an output 314, such as a display, speakers, etc., for outputting information to the user. The mobile RFID reader is power by a power supply 316, such as a battery, and may include an interface 318 to communicate with external computer devices and/or storage devices. The interface 318 may be a network interface for communicating with external devices via a network. RFID tags and RFID readers are well known in the art, and one skilled in the art will recognize that an implementation of actual RFID tags and RFID readers may contain other components as well, and that FIGS. 2 and 3 are high level representations for illustrative purposes.

Figure 4:
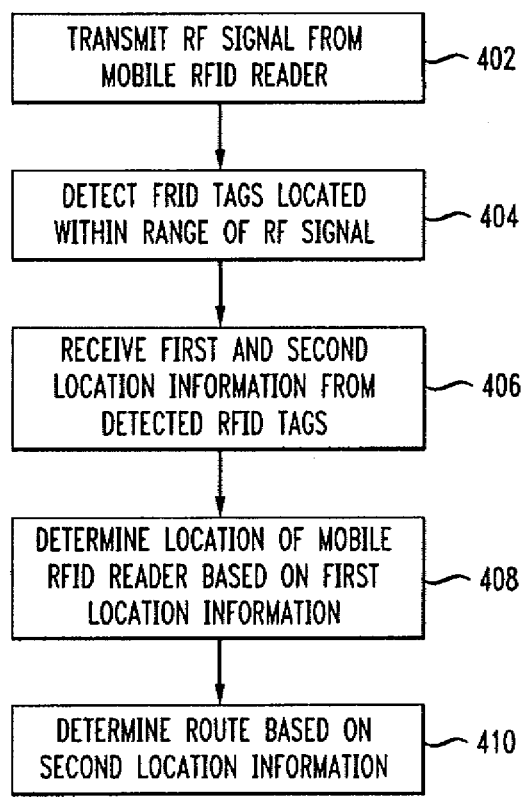
FIG. 4 illustrates a method of location determination and guidance using RFID according to an embodiment of the present invention.

FIG. 4 illustrates a method of location determination and guidance using RFID according to an embodiment of the present invention. At step 402, a mobile RFID reader transmits an RF signal. It is possible that the mobile RFID reader transmits the RF signal in response to a command input by a user to the mobile RFID reader to instruct the mobile RFID reader to search for RFID tags. For example, the user could press a button on the mobile RFID reader in order to control the mobile RFID reader to transmit the RF signal. It is also possible that the mobile RFID reader continuously or intermittently transmits an RF signal to search for RFID tags.

At step 404, RFID tags located within a range of the RF signal transmitted from the mobile RFID reader are detected by the mobile RFID reader. According to one embodiment of the present invention, the RFID reader detects all RFID tags that are located within a certain range of the RF signal transmitted by the RFID reader by detecting a backscattered RF signal transmitted by each RFID tag in response to each RFID tag receiving the RE signal transmitted by the RFID reader. Each RFID tag may include identification information, such as a serial number, in the backscattered signal. The mobile RFID reader may display a listing detected RFID tags within the range of the mobile RFID reader.

At step 406, first and second location information is received by the mobile RFID reader from the detected RFID tags. The first location information received from an RFID tag is location information of the RFID tag from which the information is received. The second location information received from an RFID tag is location information of an RFID tag other than the tag from which the location information is received. As described above, "location information" of an RFID tag can be any information associated with a location of the RFID tag. According to an embodiment of the present invention, when the mobile RFID reader receives identification information of the detected RFID tags, the RFID reader sequentially "probes" each of the detected RFID tags (i.e., transmits an RF signal to the RFID tag) to request the first and second location information stored on each tag. The mobile RFID reader then organizes the first and second location information received from each tag and allows the user to selectively view the first and second location information retrieved from each RFID tag.

According to another embodiment of the present invention, the mobile RFID reader may display a listing of the detected RFID tags by the identification information of the detected RFID tags, and allow a user to select one or more RFID tags from the listing. The mobile RFID reader than "probes" the selected one or more RFID tags to request the first and second information from each of the selected one or more RFID tags. In this case the user may choose to only receive location information from RFID tags at locations that interest the user.

According to another embodiment of the present invention, the first and second location information can be automatically transmitted from each of the detected RFID tags in the backscattered RF signal transmitted from the each of the detected RFID tags in response to receiving the RF signal transmitted by the mobile RFID reader. In this case, the mobile RFID reader groups the first and second location information with identification information for each of the detected RFID tags, and displays the information for the user.

Figure 5A:
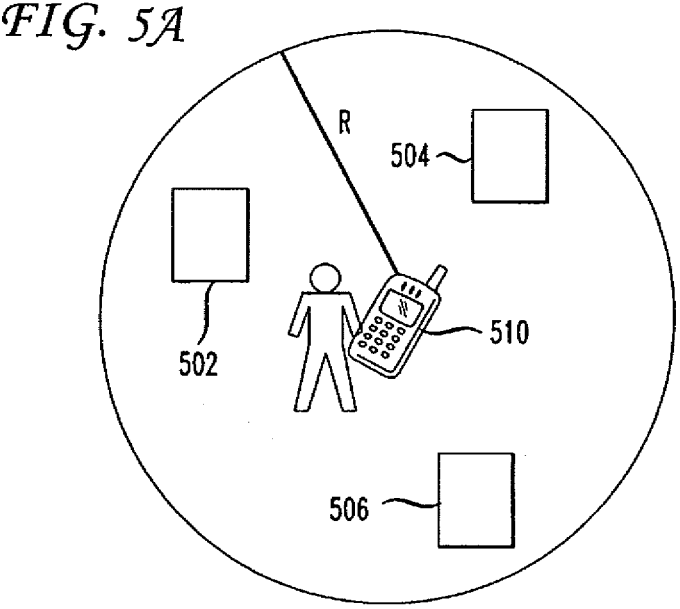
FIGS. 5A and 5B illustrate determining a location of a mobile RFID reader based on locations of fixed RFID tags according to an embodiment of the present invention.
Figure 5B:
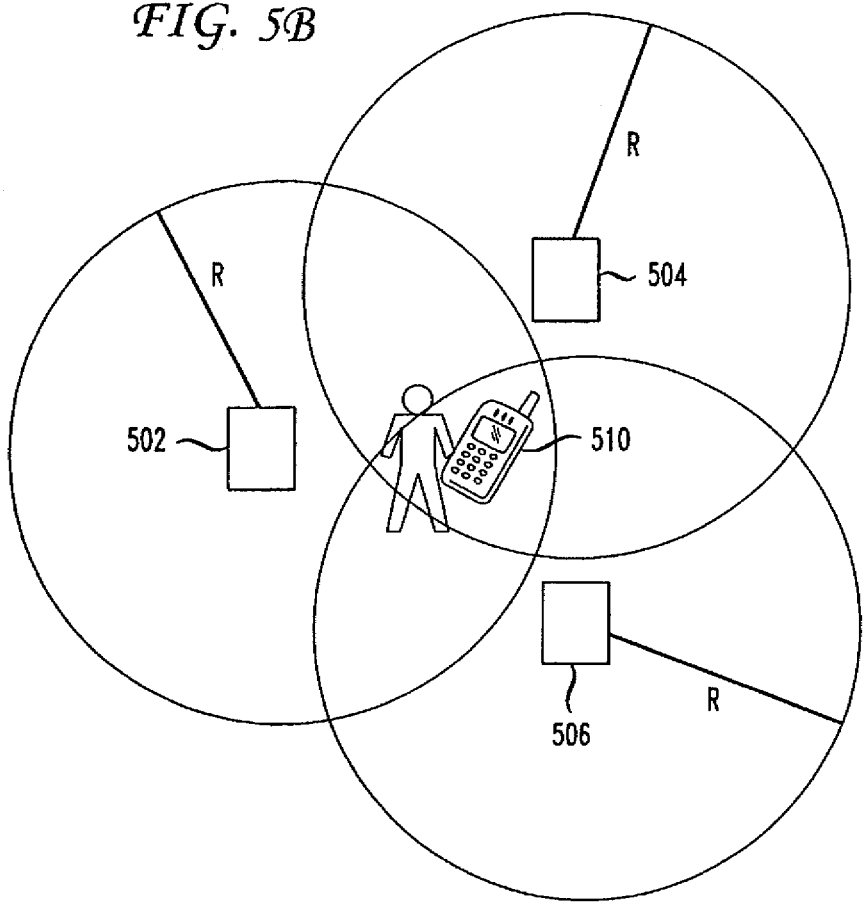

At step 408, a location of the mobile RFID reader is determined based on first location information received from one or more detected RFID tags. The first location information for each of the one or more detected RFID tags includes a location of the RFID tag. The location of the mobile RFID reader is determined based on the locations of the detected RFID tags. FIGS. 5A and 5B illustrate determining a location of a mobile RFID reader based on locations of fixed RFID tags according to an embodiment of the present invention. As illustrated in FIG. 5A a mobile RFID reader 510 has a range R and detects RFID tags 502, 504, and 506 within a radius of R around the mobile RFID reader. As illustrated in FIG. 5B for each RFID tag 502, 504, and 596 detected by the mobile RFID reader 510, the mobile RFID reader 510 can determine that its location must be within a radius of R from the location of each of the RFID tags 502, 504, and 506. Thus, the location of the mobile RFID reader 510 can be determined to be within the intersection circles of radius R from each of the detected RFID tags 502, 504, and 506. Accordingly, the location of the mobile RFID reader can be determined within increasing accuracy as the number of detected RFID tags increases.

Returning to FIG. 4, at step 410, a route is determined based on the second location information received from a detected tag from the location of the mobile RFID reader to at least one other tag. As described above, the second location information of each RFID tag is location information of at least one other RFID tag. This second location information can include the location of at least one other RFID tag, and map or route information showing a route from a location of the RFID tag which stores the second location information and the at least one other RFID tag. The determined route can be displayed as a map on the mobile RFID reader using mapping software stored on the mobile RFID reader.

According to one embodiment of the present invention, the second information received from a tag can include location information of multiple other RFID tags. In this case, the mobile RFID reader can determine a route from its current location to any or all of the other RFID tags based on the second location information. Thus, a user can select which RFID tag to go to next and be guided to the next RFID tag by the mobile RFID reader. This embodiment can be used when large environments are tagged with many points of interest, and in situations when it is beneficial for a user to have autonomy in deciding were to go and in what order. For example, this embodiment can be used for user guidance, in cities amusement parks, buildings, museums, etc. This embodiment can also be of use to fire or rescue personnel responding to an emergency. The environment may be unfamiliar to the responders, visibility may be limited due to smoke or dust, and there may be no power for lights, elevators, or other infrastructure. Nevertheless, RFID tags will still be detectable and useable for navigation According to another embodiment of the present invention, the second information received from a tag can include location information of a single other RFID tag. In this case, the mobile RFID reader determines a route to the single other RFID tag, thus guiding the user on a predetermined route from one RFID tag to the next. For example, this embodiment may be useful in emergency situations such as guiding a user to exit a building in an emergency.

Using the above described embodiments of the present invention a user can use a mobile RFID reader to determine a location of the user and to guide the user to various locations or points of interest based on RFID tags located at fixed locations. According to an embodiment of the present invention, the RFID tags can include writeable memory, and users can add additional location information or change existing location information stored in an RFD tag by transmitting additional location information from a mobile RFID reader. For example, in emergency situations emergency workers can transmit additional first location information to an RFID tag in order to "mark" that a particular worker has passed that particular RFID tag or that an area in the vicinity of the RFID tag has been searched. Thus, it is possible to track emergency workers using the same stationary RFID tags that guide the emergency workers. It is also for emergency workers to determine if an area has been searched.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operation of a portable device, comprising:
transmitting, by a processor, a radio frequency signal;
detecting, by the processor, a plurality of radio frequency identification tags based on a plurality of signals received in response to the radio frequency signal;
receiving, by the processor, from the plurality of radio frequency identification tags, first location information of a first radio frequency identification tag and second location information of a second radio frequency identification tag; and
determining, by the processor, a route from a location of the portable device to a location of the second radio frequency identification tag based on the second location information and the first location information, wherein the second location information further comprises map information showing a route between a location of the first radio frequency identification tag and the location of the second radio frequency identification tag.

2. The method of claim 1, wherein the first location information comprises the location of the first radio frequency identification tag and the second location information comprises the location of the second radio frequency identification tag.

3. The method of claim 1, wherein the detecting the plurality of radio frequency identification tags comprises:
   detecting all radio frequency identification tags within a range of the radio frequency signal transmitted from the portable device.

4. The method of claim 3, wherein the receiving from the plurality of radio frequency identification tags, the first location information and the second location information comprises:
   selecting a first radio frequency identification tag from the radio frequency identification tags within the range of the radio frequency signal; and
   receiving the first location information and the second location information from the first radio frequency identification tag that is selected.

5. The method of claim 1, further comprising:
   transmitting additional first location information to one of the plurality of radio frequency identification tags.

6. The method of claim 1, further comprising:
   transmitting additional second location information to one of the plurality of radio frequency identification tags.

7. A mobile radio frequency identification reader device, comprising:
   a processor; and
   a computer-readable medium storing a plurality of instructions which, when executed by the processor, cause the processor to perform operations, the operations comprising:
      transmitting a radio frequency signal;
      detecting a plurality of radio frequency identification tags based on a plurality of signals received in response to the radio frequency signal;
      receiving from the plurality of radio frequency identification tags, first location information of a first radio frequency identification tag and second location information of a second radio frequency identification tag; and
      determining a route from a location of the portable device to a location of the second radio frequency identification tag based on the second location information and the first location information, wherein the second location information further comprises map information showing a route between a location of the first radio frequency identification tag and the location of the second radio frequency identification tag.

8. The mobile radio frequency identification reader device of claim 7, wherein the first location information comprises the location of the first radio frequency identification tag and the second location information comprises the location of the second radio frequency identification tag.

9. The mobile radio frequency identification reader device of claim 7, wherein the detecting the plurality of radio frequency identification tags comprises:
   detecting all radio frequency identification tags within a range of the radio frequency signal transmitted from the portable device.

10. The mobile radio frequency identification reader device of claim 9, wherein the receiving from the plurality of radio frequency identification tags, the first location information and the second location information comprises:
   selecting a first radio frequency identification tag from the radio frequency identification tags within the range of the radio frequency signal; and
   receiving the first location information and the second location information from the first radio frequency identification tag that is selected.

11. The mobile radio frequency identification reader device of claim 7, further comprising:
   transmitting additional first location information to one of the plurality of radio frequency identification tags.

12. The mobile radio frequency identification reader device of claim 7, further comprising:
   transmitting additional second location information to one of the plurality of radio frequency identification tags.

13. A non-transitory computer-readable medium storing a plurality of instructions which, when executed by a processor, cause the processor to perform operations for providing security on a mobile endpoint device, the operations comprising:
   transmitting a radio frequency signal;
   detecting a plurality of radio frequency identification tags based on a plurality of signals received in response to the radio frequency signal;
   receiving from the plurality of radio frequency identification tags, first location information of a first radio frequency identification tag and second location information of a second radio frequency identification tag; and
   determining a route from a location of the portable device to a location of the second radio frequency identification tag based on the second location information and the first location information, wherein the second location information further comprises map information showing a route between a location of the first radio frequency identification tag and the location of the second radio frequency identification tag.

14. The non-transitory computer-readable medium of claim 13, wherein the first location information comprises the location of the first radio frequency identification tag and the second location information comprises the location of the second radio frequency identification tag.

15. The non-transitory computer-readable medium of claim 13, wherein the detecting the plurality of radio frequency identification tags comprises:
   detecting all radio frequency identification tags within a range of the radio frequency signal transmitted from the portable device.

16. The non-transitory computer-readable medium of claim 15, wherein the receiving from the plurality of radio frequency identification tags, the first location information and the second location information comprises:
   selecting a first radio frequency identification tag from the radio frequency identification tags within the range of the radio frequency signal; and
   receiving the first location information and the second location information from the first radio frequency identification tag that is selected.

17. The non-transitory computer-readable medium of claim 13, further comprising:
   transmitting additional first location information to one of the plurality of radio frequency identification tags.

18. The non-transitory computer-readable medium of claim 13, further comprising:
   transmitting additional second location information to one of the plurality of radio frequency identification tags.

* * * * *